(12) United States Patent
Imasato et al.

(10) Patent No.: US 6,743,551 B2
(45) Date of Patent: Jun. 1, 2004

(54) ALKALINE STORAGE BATTERY

(75) Inventors: Atsumu Imasato, Sumoto (JP); Takaaki Ikemachi, Tsuna-gun (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 10/109,644

(22) Filed: Apr. 1, 2002

(65) Prior Publication Data

US 2002/0177045 A1 Nov. 28, 2002

(30) Foreign Application Priority Data

Mar. 30, 2001 (JP) .................................. P. 2001-100896

(51) Int. Cl.[7] ................................................ H01M 2/16
(52) U.S. Cl. .................... 429/250; 429/206; 429/254
(58) Field of Search .............................. 429/254, 142, 429/206

(56) References Cited

U.S. PATENT DOCUMENTS 5,830,603 A * 11/1998 Oka et al. ............... 429/254 X
6,423,445 B1 * 7/2002 Kato et al. ............... 429/142

FOREIGN PATENT DOCUMENTS

JP 5-205719 * 8/1993

* cited by examiner

Primary Examiner—John S. Maples
(74) Attorney, Agent, or Firm—Nixon & Vanderhye P.C.

(57) ABSTRACT

The separator 10a for use in the alkaline storage battery of the invention comprises densely and uniformly formed over the entire separator and entrained from the surface to the back plane of the separator, first fine paths (pores) 15 rendered hydrophilic and second fine paths (pores) 16 rendered non-hydrophilic. In this manner, the gas generated in the vicinity of the first fine paths (pores) 15 can immediately reach the second fine paths (pores) 16 formed in the vicinity of the first fine paths (pores) 15 and transferred. On the other hand, the ions that attempt passing through the second fine paths (pores) 16 can readily reach the first fine paths (pores) 15 formed in the vicinity of the second fine paths (pores) 16, and hence, the ions can be transferred through the first fine paths (pores) 15.

4 Claims, 1 Drawing Sheet

ALKALINE STORAGE BATTERY

BACKGROUND OF THE INVENTION

The present invention relates to alkaline storage batteries such as nickel-hydrogen storage batteries and nickel-cadmium storage batteries, and to a method for producing the same. Particularly, it relates to alkaline storage batteries the separator incorporated between the positive electrode and the negative electrode, and to a method for producing the same.

In general, alkaline storage batteries such as nickel-hydrogen batteries and nickel-cadmium batteries are produced by forming a group of electrodes by incorporating a separator between the positive electrode and the negative electrode, placing the group of electrodes inside a metallic outer casing (cell casing), welding a collector lead extended out from the positive electrode of the group of electrodes to the lower plane of the sealing body, and, after injecting the electrolyte, airtight sealing the cell casing by attaching the sealing body to the aperture portion of the cell casing. The separator used in the alkaline storage batteries above is required to have not only a sufficiently high mechanical strength, but also an excellent resistance against strong alkali included in the electrolyte, and it should retain a sufficient amount of electrolyte and maintain sufficiently high gas permeability while maintaining the alkaline electrolyte.

As a material for use in the separator above, mainly used conventionally was a non-woven cloth made of polyamide fibers; however, since this material suffered problems concerning its resistances against alkalis and oxidation, recently brought into use are non-woven cloth made of polyolefin resin fibers. In order to respond to the recent increase in capacity of alkaline storage batteries, however, there has been proposed to increase the cell capacity by reducing the volume of the separator by using thinner separators, thereby increasing the filling amount of active material. In this context, the use of fine-pored resin membrane separator has been proposed, because it enables a separator thinner than that made of a non-woven cloth.

The pore diameter of the fine pores of a fine-pored resin membrane separator is set small to prevent internal short circuit from occurring. However, the gas permeability decreases with reducing pore diameter of the fine pores. Thus, it has been proposed to impart hydrophilic properties or gas permeability to the fine-pored resin membrane separator. For instance, in JP-A-05-205719 is proposed to pattern forming a hydrophilic portion and a hydrophobic portion (non-hydrophilic portion) on the fine-pored resin membrane separator by means of printing.

Since the method proposed in JP-A05-205719 comprises pattern forming a hydrophilic portion and a hydrophobic (non-hydrophilic) portion by means of printing, not only the production method is simplified, but also the gas permeability is increased as to suppress the increase of internal pressure of the cell. In this manner, an alkaline storage battery with long life can be realized.

However, since the method proposed in JP-A-05-205719 comprises pattern forming the hydrophilic portion and the non-hydrophilic portion, there was limit in forming dense patterns, and it was found impossible to form hydrophilic regions and non-hydrophilic regions in fine units. Accordingly, it was found impossible to achieve ion permeability well compatible with gas permeability, and it resulted in problem of realizing sufficiently high cell characteristics.

In case a pattern of hydrophilic region and a hydrophobic region is formed on the fine-pored resin membrane separator, the portion of the hydrophilic region suffers poor gas permeability, whereas the portion of the non-hydrophilic region exhibits low ion permeability. In case it is impossible to form hydrophilic regions and non-hydrophilic regions in fine units, the gas generated in the portion of the hydrophilic region can no longer reach to the non-hydrophilic region as to increase the pressure inside the cells. In the non-hydrophilic region, on the other hand, difficulty is found on the permeation of ions, and the active material disposed opposed to this portion becomes less reactive as to lead to a drop in discharge characteristics.

SUMMARY OF THE INVENTION

In the light of the aforementioned circumstances, the invention has been made to overcome the problems above, and an object of the invention is to provide an alkaline storage battery having improved cycle life characteristics by suppressing the increase in internal pressure of the cell and also improved in utilization factor of the active material. Thus, there is provided an alkaline storage battery comprising a separator having densely and uniformly formed over the entire body thereof hydrophilic portions and non-hydrophilic portions, thereby providing a fine-pored resin membrane separator having excellent ion permeability and gas permeability.

In order to solve the problems above, the separator for use in the alkaline storage battery of the invention made from a polyolefin resin comprises densely and uniformly formed over the entire separator, first fine paths (series of pores) entrained from the surface to the back plane, and second fine path (series of pores) entrained from the back plane to the surface; provided that the inner wall of the first fine paths (pores) is imparted hydrophilic, and that the inner wall of the second fine paths (pores) is not imparted hydrophilic.

By thus forming first fine pores entrained from the surface to the backplane with the inner walls of the first pores rendered hydrophilic and second fine pores entrained from the back plane to the surface with the inner wall of the second fine pores rendered non-hydrophilic, the gas generated in the vicinity of the first fine pores having its inner walls rendered hydrophilic can be immediately reach the second fine pores provided in the vicinity of the second fine pores having its inner wall not rendered hydrophilic. Accordingly, the gas generated in the vicinity of the first fine pores can pass through the second fine pores to suppress the increase of the inner pressure. On the other hand, the ions passing through the second fine pores can immediately reach the first fine pores having the inner wall rendered hydrophilic. In this manner, the ions passing thorough the second fine pores are transferred through the first fine pores; hence, the utilization factor of the active material is increased because the active material disposed opposed to this portion is allowed to react more easily.

In case the volume ratio of the first fine pores with respect to the second fine pores is increased as large as 95:5, it has been found through experiments that the internal pressure of the cell increases and that the utilization factor of the active material decreases. Moreover, in case the volume ratio of the first fine pores with respect to the second fine pores should be decreased to 45:55, it has also been found that the internal pressure of the cell increases while decreasing the utilization factor of the active material.

From the results thus obtained, it can be understood that the volume ratio of the first fine pores and the second pores is preferably in a range of from 90:10 to 50:50.

To solve the aforementioned problems, the method for producing the separator for use in the alkaline storage battery of the invention made from a polyolefin resin comprises a mixing step comprising mixing a first powder comprising an alkali-soluble powder surface coated with a hydrophilic material, a second powder comprising an alkali-soluble powder, and a third powder comprising a polyolefin resin powder; a filming step for forming a membrane from the mixed powder; and an eluting step comprising immersing the membrane thus formed in an alkaline solution to elute out the alkali-soluble powder.

In case a membrane is formed by filming the mixed powder above, the resulting membrane comprises a portion made of continuously connected first powder made from the alkali-soluble powder coated with a hydrophilic material and a portion made of continuously connected second powder composed of the alkali-soluble powder finely and densely dispersed and arranged in the third powder made of polyolefin resin powder. Then, by immersing the resulting membrane in an alkaline aqueous solution to elute out the alkali-soluble powder, the hydrophilic material remains without being eluted out in the alkaline aqueous solution. Furthermore, the first powder is eluted out into the alkaline aqueous solution from the portion comprising the continuously connected first powder to provide an entrained eluted out portion, while the second powder is eluted out into the alkaline aqueous solution from the portion comprising the continuously connected second powder to provide an entrained eluted out portion.

In this manner, the first fine pores rendered hydrophilic and the second fine pores rendered non-hydrophilic are formed, while the first and the second fine pores are densely and uniformly dispersed inside the separator. Thus, there can be implemented an alkaline storage battery having its increase in internal pressure of the cell being suppressed, and having the utilization factor of the active material improved. To set the volume ratio of the first fine pores with respect to the second fine pores in a range of from 90:10 to 50:50 in this case, the mass ratio of the first powder and the second powder must be set in a range of from 90:10 to 50:50. Preferably, silicate powder is used as the alkali-soluble powder.

DETAILED DESCRIPTION OF THE PREFERRED EMBODIMENTS

Figure 1:
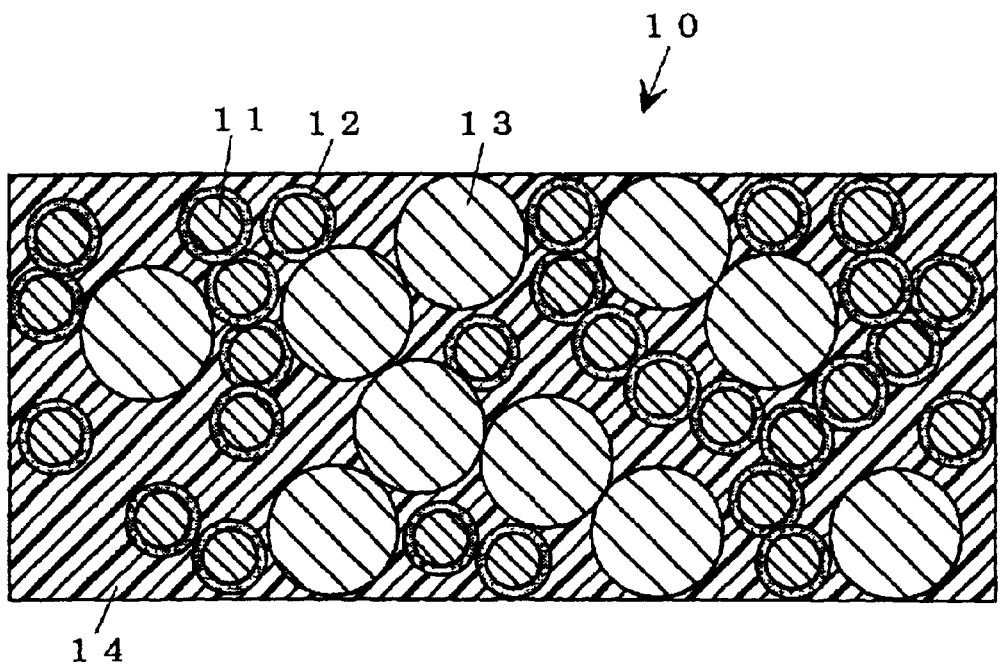
FIG. 1 is a cross section view schematically showing an enlarged part of the separator during fabrication according to the invention.
Figure 2:
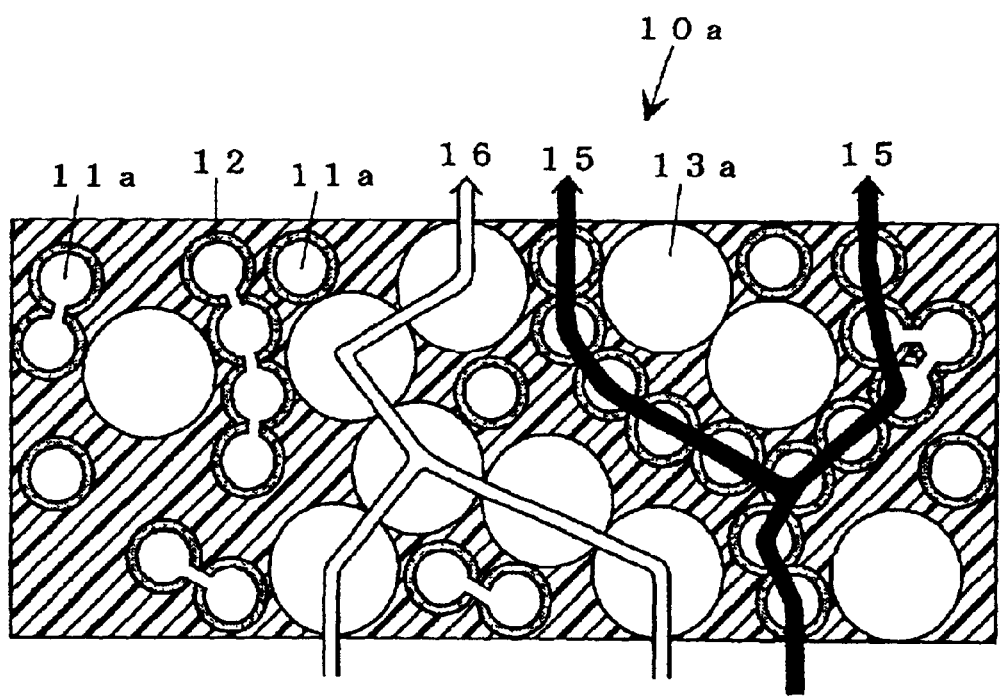
FIG. 2 is a cross section view schematically showing an enlarged part of the separator fabricated in accordance with the method of the invention.

An embodiment of practicing the invention in case of applying the invention to a nickel-hydrogen battery is described below with reference to FIGS. 1 and 2. FIG. 1 is a cross section view schematically showing an enlarged part of the separator during fabrication. FIG. 2 is across section view schematically showing an enlarged part of the separator fabricated in accordance with the method of the invention.

1. Preparation of the Alkali-soluble Powder Coated with a Hydrophilic Material

As the alkali-soluble power, silicate powder 11 consisting of particles having an average particle diameter of 2 $\mu$m was prepared, and sodium dodecyl sulfate (SDS: $CH_3(CH_2)_{10}CH_2OSO_3Na$) was prepared as the hydrophilic material. Then, after dispersing the silicate powder 11 consisting of particles 2 $\mu$m in average particle diameter in an aqueous sodium dodecyl sulfate solution of a predetermined concentration, the resulting product was dried with a spray dryer to prepare silicate powder 11 coated with sodium dodecyl sulfate 12. In this case, the concentration of the aqueous sodium dodecyl sulfate solution was controlled as such that the amount of the sodium dodecyl sulfate may account for 4 mass % with respect to the silicate powder.

2. Preparation of the Separator (1) EXAMPLE 1

First, a mixed silicate powder was prepared by mixing the silicate powder 11 surface coated with sodium dodecyl sulfate 12 prepared above with a silicate powder 13 not surface covered with sodium dodecyl sulfate and composed of particles 20 $\mu$m in average particle diameter at amass ratio of 90:10. Then, after mixing the mixed silicate powder with polyethylene resin powder 14 at a mass ratio of 75:25, the mixed powder was formed into a planar membrane-like shape 80 $\mu$m in thickness by using a film manufacturing apparatus comprising a T-die attached to a biaxial extruder. Thus was obtained a fine-pored membrane 10.

By thus differing the particle diameter of the silicate powder 11 surface coated with sodium dodecyl sulfate 12 from that of the silicate powder 13 not surface covered with sodium dodecyl sulfate, the probability of bringing the particles of the silicate powder 11 surface coated with sodium dodecyl sulfate 12 in contact with each other, as well as that of bringing the particles of the silicate powder 13 not surface covered with sodium dodecyl sulfate in contact with each other, can be increased. This fact results in firmly forming, as described hereinafter, the ion permeating path 15 and the gas permeating path 16 (see FIG. 2). Thus, the average particle diameter of the silicate powder 11 is preferably differed from that of the silicate powder 13.

Thus, as shown schematically in FIG. 1, the fine-pored membrane 10 thus obtained comprises a portion in which the silicate powder 13 particles with larger diameter are continuously connected with each other, and a portion in which the silicate powder 11 surface coated with sodium dodecyl sulfate are continuously connected with each other, being densely and uniformly dispersed, formed, and arranged in the polyethylene resin powder 14.

The fine-pored membrane 10 thus obtained was immersed in an aqueous alkali solution to elute out the silicate powders 11 and 13 to obtain a partially rendered hydrophilic film-like fine-pored membrane 10a. As shown schematically in FIG. 2, the film-like fine-pored membrane 10a thus obtained contains remaining therein sodium dodecyl sulfate 12 without being eluted out in the aqueous alkali solution, and comprises formed therein the portion in which the particles of the silicate powder 11 are continuously connected with each other and the portion in which the particles of the silicate powder 13 are continuously connected with each other, such that the silicate powder eluted portions 11a and 13a that are formed by elution to aqueous alkali solution are each entrained to form an ion-permeating path (first fine pores) 15 and a gas-permeating path (second fine pores) 16. In this manner, the ion-permeating path 15 and the gas-permeating path 16 are formed densely and uniformly dispersed in the film-like fine-pored membrane 10a. The film-like fine-pored membrane 10a thus fabricated is denoted as separator a of Example 1.

(2) EXAMPLE 2

A film-like fine-pored-membrane 10a was obtained in a manner similar to that described in Example 1 above, except for preparing the mixed silicate powder by mixing the silicate powder 11 surface coated with sodium dodecyl sulfate 12 prepared above with a silicate powder 13 not surface covered with sodium dodecyl sulfate and composed of particles 20 μm in average particle diameter at a mass ratio of 60:30. Thus was obtained a separator b of Example 2.

(3) EXAMPLE 3

A film-like fine-pored membrane 10a was obtained in a manner similar to that described in Example 1 above, except for preparing the mixed silicate powder by mixing the silicate powder 11 surface coated with sodium dodecyl sulfate 12 prepared above with a silicate powder 13 not surface covered with sodium dodecyl sulfate and composed of particles 20 μm in average particle diameter at amass ratio of 50:50. Thus was obtained a separator c of Example 3.

(4) EXAMPLE 4

A film-like fine-pored membrane 10a was obtained in a manner similar to that described in Example 1 above, except for preparing the mixed silicate powder by mixing the silicate powder 11 surface coated with sodium dodecyl sulfate 12 prepared above with a silicate powder 13 not surface covered with sodium dodecyl sulfate and composed of particles 20 μm in average particle diameter at a mass ratio of 95:5. Thus was obtained a separator d of Example 4.

(5) EXAMPLE 5

A film-like fine-pored membrane 10a was obtained in a manner similar to that described in Example 1 above, except for preparing the mixed silicate powder by mixing the silicate powder 11 surface coated with sodium dodecyl sulfate 12 prepared above with a silicate powder 13 not surface covered with sodium dodecyl sulfate and composed of particles 20 μm in average particle diameter at a mass ratio of 45:55. Thus was obtained a separator e of Example 5.

(6) Comparative Examples 1, 2, 3

After mixing a silicate powder having an average particle size of 20 μm with a polyethylene resin powder at a mass ratio of 75:25, fine-pored membrane was obtained by filming the mixed powder into a planar membrane-like shape 80 μm in thickness by using a film manufacturing apparatus comprising a T-die attached to a biaxial extruder. Then, a solution prepared by dissolving acetyl cellulose in acetic acid was applied by dot printing under suction to the portion for forming the hydrophilic part of the fine-pored membrane thus obtained. Then, saponification treatment was performed thereafter by using caustic soda to obtain a fine-pored membrane having partially rendered hydrophilic.

Furthermore, spot regions not coated with the solution prepared by dissolving acetyl cellulose in acetic acid were provided at dot printing to form non-hydrophilic portions for use in gas permeation. In this case, the non-hydrophilic portions were each formed in circular shapes 0.2 mm in diameter to obtain a dot pattern. Thus were obtained the fine-pored membrane partially rendered hydrophilic comprising the hydrophilic portion and the non-hydrophilic portion at an area ratio of 90:10 as separator x of Comparative Example 1, the fine-pored membrane partially rendered hydrophilic with the area ratio of 70:30 as separator y of Comparative Example 2, and the fine-pored membrane partially rendered hydrophilic with the area ratio of 50:50 as separator z of Comparative Example 3.

3. Production of Nickel-hydrogen Battery

First, 100 parts by mass of a powder of positive electrode active material containing nickel hydroxide as the principal component was mixed with 50 parts by mass of an aqueous solution dissolved therein 0.2 mass % of hydroxypropyl cellulose to obtain a slurry of positive electrode active material. The slurry of the positive electrode active material thus obtained was filled in foamed nickel having a porosity of 95%, and after drying, the resulting product was rolled to obtain a nickel positive electrode.

Separately, a powder of a hydrogen-absorbing alloy prepared by using a high frequency melting furnace was mixed with a binder such as polytetrafluoroethylene (PTFE) and a proper amount of water to obtain a paste of a hydrogen-absorbing alloy. The hydrogen-absorbing alloy paste thus obtained was applied to the both sides of an negative electrode substrate made from a punched metal, dried, and pressed to obtain a hydrogen-absorbing alloy negative electrode having a predetermined thickness.

The separators a to e and x to z thus obtained above were each interposed between the alternately stacked nickel positive electrodes and the hydrogen-absorbing alloy negative electrodes prepared above to obtain each of the electrode groups. Each electrode group was assembled inside a square outer sheath (e.g., a can 16.5 mm in outer width, 33.5 mm in height, and 5.6 mm in thickness). Then, after welding the negative electrode collector lead to the inner bottom plane and the front edge portion of the positive electrode collector lead to the bottom plane of the sealing body, a predetermined quantity of an electrolyte (a 7.2 mol/l aqueous potassium hydroxide solution) was injected into the outer sheath.

By fixing and airtight sealing the sealing body thus obtained to the aperture portion of the outer sheath, square nickel-hydrogen batteries A, B, C, D, E, X, Y, and Z, each having a theoretical capacity of approximately 670 mAh and a theoretical capacity ratio of negative electrode to positive electrode of 1.2, were obtained. The cell A was obtained from separator a; similarly, cells B, C, D, and E were each obtained from separators b, c, d, and e, respectively. Cells X, Y, and Z were each prepared from separators x, y, and z, respectively.

4. Cell Evaluation Test

Each of the nickel-hydrogen batteries A, B, C, D, E, X, Y, and Z thus obtained above was charged at a charging current of 67 mA (i.e., 0.1 It [where, It is a value expressed by a theoretical capacity (mAh) per 1 h (time)]) under an atmosphere the surrounding temperature was maintained at 25° C. (room temperature) for a duration of 15 hours, stopped charging for 1 hour, was allowed to discharge at a discharge current of 670 mA (1 It) until a final discharge voltage of 1.0 V was attained, and stopped discharging for 1 hour. The charge-discharge process was repeated twice to activate each of the cells A to E and X to Z.

(1) Measurement of Utilization Factor for Active Material

Each of the nickel-hydrogen batteries A, B, C, D, E, X, Y, and Z thus activated was charged at a charge current of 67 mA (0.1 It) for a duration of 15 hours under an atmosphere the surrounding temperature was maintained at 25° C. (room temperature), and was allowed to discharge at a discharge current of 134 mA (0.2 It) until a final discharge voltage of 1.0 V was attained. The discharge capacity was thus obtained from the discharge time. The ratio of the discharge capacity with respect to the theoretical capacity was calculated to obtain the utilization factor. The results are given in Table 1 below.

(2) Measurement of Internal Pressure Inside the Cell

Each of the nickel-hydrogen batteries A, B, C, D, E, X, Y, and Z thus activated was charged at a charge current of 670 mA (1 It) for a duration of 2 hours under an atmosphere the surrounding temperature was maintained at 25° C. (room temperature) to obtain the maximum internal pressure (MPa) of the charged cell. The results are given in Table 1 below.

On performing the cell evaluation tests above, the amount of the electrolyte injected into the outer sheath was adjusted depending on the type of the separator used, such that the internal pressure of the cell may be set to 1 MPa or lower.

TABLE 1

| Type of Cell | Mixing ratio of hydrophilic to non-hydrophulic portion of the separator | | Amount of electrolyte (g) | Utilization factor of active material (%) | Internal pressure of cell (MPa) |
|---|---|---|---|---|---|
| | Powder ratio | Area ratio | | | |
| A | 90:10 | — | 0.82 | 98.6 | 0.83 |
| B | 70:30 | — | 0.80 | 98.0 | 0.65 |
| C | 50:50 | — | 0.85 | 98.1 | 0.86 |
| D | 95:5 | — | 0.70 | 90.3 | 0.92 |
| E | 45:55 | — | 0.90 | 93.0 | 0.92 |
| X | — | 90:10 | 0.75 | 88.6 | 0.96 |
| Y | — | 70:30 | 0.85 | 95.7 | 0.94 |
| Z | — | 50:50 | 0.85 | 90.9 | 0.97 |

As shown clearly in the results given in Table 1, it can be understood that, as compared with the cells X to Z using each of the separators x to z of Comparative Examples 1 to 3, the cells A to E using each of the separators a to e obtained in Examples 1 to 5 above yield higher utilization factors while suppressing the increase in internal pressure of the cell. The above result is believed attributed to the fact that the separators x to z of Comparative Examples 1 to 3 comprise hydrophilic portions and non-hydrophilic portions pattern-formed by a printing method on the fine-pored film membrane, and that this made it impossible to form the hydrophilic portions and non-hydrophilic portions in fine units. Accordingly, this makes it unfeasible for the gas generated in the vicinity of the hydrophilic portions to permeate through the poorly gas-permeable hydrophilic portions, or to immediately reach the non-hydrophilic portions. Hence, the generated gas resides inside the cell to increase the internal pressure of the cell. On the other hand, the ions generated by the cell reaction cannot permeate through the poorly ion-permeable non-hydrophilic portion, nor can immediately reach the hydrophilic portion on passing through the non-hydrophilic portions. Thus, the cell reaction of the active material faced opposed to this portion decreases as to lower the utilization factor of the active material.

On the other hand, since each of the separators a to e obtained in Examples 1 to 5 were immersed in an aqueous alkaline solution as to elute out the silicate powder 11 and to keep sodium dodecyl sulfate 12 to provide a hydrophilic material, as shown schematically in FIG. 2, not only ion-permeating paths (first fine pores) 15 rendered hydrophilic are formed by entraining the portions 11a formed in case silicate powder 11 was eluted out in the aqueous alkaline solution, from which, but also gas-permeating paths (second fine pores) 16 rendered non-hydrophilic are formed in large diameters by entraining the portions 13a formed in case silicate powder 13 was eluted out in the aqueous alkaline solution. Moreover, these paths are formed densely and uniformly dispersed in the film-like fine-pored membrane 10a.

Thus, the ion-permeating paths (first fine pores) 15 and the gas-permeating paths (second fine pores) 16 are formed in fine units. As a result, the gas generated in the vicinity of the ion-permeating paths (first fine pores) 15 can immediately reach the gas-permeating paths (second fine pores) 16 formed in the vicinity of the ion-permeating paths (first fine pores) 15 and can be transferred through the gas-permeating paths (second fine pores) 16. In this manner, the increase in internal pressure of the cell can be suppressed.

On the other hand, the ions that attempt passing through the gas-permeating paths (second fine pores) 16 can readily reach the ion-permeating paths (first fine pores) 15 formed in the vicinity of the gas-permeating paths (second fine pores) 16, and hence, the ions can be transferred through the ion-permeating paths (first fine pores) 15. In this manner, the cell reaction of the active material disposed opposed to this portion is accelerated to increase the utilization factor of the active material.

In case of the separator d of Example 4 using silicate powder surface coated with a hydrophilic material (sodium dodecyl sulfate) and the silicate powder having no surface coating at a mixing ratio of 95:5, it can be understood that the internal pressure of the cell is increased and that the utilization factor of the active material is lowered as compared with the case using separators a to c of Examples 1 to 3. Furthermore, also in case of the separator e of Example 5 using a surface coated silicate and the silicate powder having no surface coating at a mixing ratio of 45:55, it can be understood that the internal pressure of the cell is increased and that the utilization factor of the active material is lowered as compared with the case using separators a to c of Examples 1 to 3.

In view of the results above, the preferred mixing ratio for the silicate powder surface coated with a hydrophilic material (sodium dodecyl sulfate) and the silicate powder having no surface coating is in a range of from 90:10 to 50:50. Since the specific gravity of the silicate powder surface coated with a hydrophilic material and that of the silicate powder having no surface coating is the same, the mixing ratio equals to the volume ratio. Thus, the mixing ratio of the silicate powders can be understood as the volume ratio of the ion-permeating paths (first fine pores) 15 and the gas-permeating paths (second fine pores) 16 that were formed through elution to aqueous alkaline solution.

As described above, in the alkaline storage batteries of the invention, the separator comprises over the entire body, densely and uniformly formed ion-permeating paths (first fine pores) rendered hydrophilic and entrained from the surface to the back plane, as well as gas-permeating paths (second fine pores) rendered non-hydrophilic and entrained from the back plane to the surface. Thus, the gas generated in the vicinity of the ion-permeating paths (first fine pores) 15 can immediately reach the gas-permeating paths (second fine pores) 16 formed in the vicinity of the ion-permeating paths (first fine pores) 15 and can be transferred through the gas-permeating paths (second fine pores) 16. In this manner, the increase in internal pressure of the cell can be suppressed.

On the other hand, the ions that attempt passing through the gas-permeating paths (second fine pores) 16 can readily reach the ion-permeating paths (first fine pores) 15 formed in the vicinity of the gas-permeating paths (second fine pores) 16, and hence, the ions can be transferred through the ion-permeating paths (first fine pores) 15. In this manner, the cell reaction of the active material disposed opposed to this portion is accelerated to increase the utilization factor of the active material. As a result, an alkaline storage battery improved in utilization factor of the active material can be obtained while suppressing the increase in internal pressure of the cell.

In the embodiment described above, explanation was made specifically on an example of using sodium dodecyl sulfate as the hydrophilic material. However, in addition to the alcohol sulfate ester surfactants such as sodium dodecyl sulfate, usable as the hydrophilic material are, for instance, an alkyl benzene sulfonate such as sodium dodecyl benzene sulfonate, an anionic surfactant of a higher fatty acid salts such as sodium dodecanate, a cationic surfactant, or an amphoteric surfactant.

Furthermore, in the embodiment above, explanation was made specifically for a case using silicate powder as the alkali-soluble material. However, zinc oxide powder and the like may be used for the alkali-soluble material.

Further, in the embodiment above, explanation was made specifically on a case using polyethylene resin for the polyolefin resin material to use as the base material of the separator of the invention. However, polyethylene based resins other than polyethylene, as well as polypropylene resins, may be used as the polyolefin resin material.

In the embodiment above, furthermore, explanation was made specifically on a case of applying the invention to a nickel-hydrogen battery. However, it can be clearly understood that the invention not only is limited to a nickel-hydrogen battery, but also is applicable to other alkaline storage batteries such as a nickel-cadmium battery.

More over, the embodiment above specifically refers to a case in which the invention is applied to square batteries, however, it is obvious that the invention is not only limited thereto, but that it is applicable to various types of batteries differing in shape, such as cylindrical batteries.

What is claimed is:

1. An alkaline storage battery comprising:

a positive electrode;

an negative electrode a separator which separates the positive electrode from the negative electrode; and an alkaline electrolyte, wherein said separator has first fine pore paths entrained from one surface to an opposite surface, and second fine pore paths entrained from the opposite surface to the one surface, and inner walls of the first fine pore paths are imparted hydrophilic, and inner walls of the second fine pore paths are not imparted hydrophilic.

2. An alkaline storage battery as claimed in claim 1, wherein the volume ratio of the first fine pore paths entrained from the one surface to the opposite surface, and the second fine pore paths entrained from opposite surface to the one surface is in a range of from 90:10 to 50:50.

3. An alkaline storage battery as claimed in claim 1, wherein the inner wall of the first fine pore paths is imparted hydrophilic with a surfactant.

4. An alkaline storage battery as claimed in claim 1, wherein said separator is made from a polyolefin resin.

* * * * *